Sept. 15, 1925.

F. H. SMITH 1,553,564

TAKE-UP MECHANISM FOR LOOMS

Filed March 17, 1924

INVENTOR
FREDERICK H. SMITH
ATTORNEYS

Patented Sept. 15, 1925.

1,553,564

UNITED STATES PATENT OFFICE.

FREDERICK H. SMITH, OF VALLEY FALLS, RHODE ISLAND, ASSIGNOR TO CROMPTON & KNOWLES LOOM WORKS, OF WORCESTER, MASSACHUSETTS, A CORPORATION OF MASSACHUSETTS.

TAKE-UP MECHANISM FOR LOOMS.

Application filed March 17, 1924. Serial No. 699,711.

*To all whom it may concern:*

Be it known that I, FREDERICK H. SMITH, a citizen of the United States, residing at Valley Falls, in the county of Providence and State of Rhode Island, have invented a new and useful Take-Up Mechanism for Looms, of which the following is a specification.

This invention relates to a take-up mechanism for winding up cloth or fabric as it is produced by a loom.

It is the general object of my invention to provide a take-up mechanism which will have a very wide range of feed so that the rate of winding may be greatly varied.

My invention is shown applied to the class of take-up mechanism which is driven directly from the lay or the lay sword of the loom and the invention has particular reference to certain constructions in mechanisms of this type by which the take-up is rendered more easily adaptable to varying operating conditions.

My invention further relates to arrangements and combinations of parts which will be hereinafter described and more particularly pointed out in the appended claims.

A preferred form of the invention is shown in the drawings in which—

Figure 1:
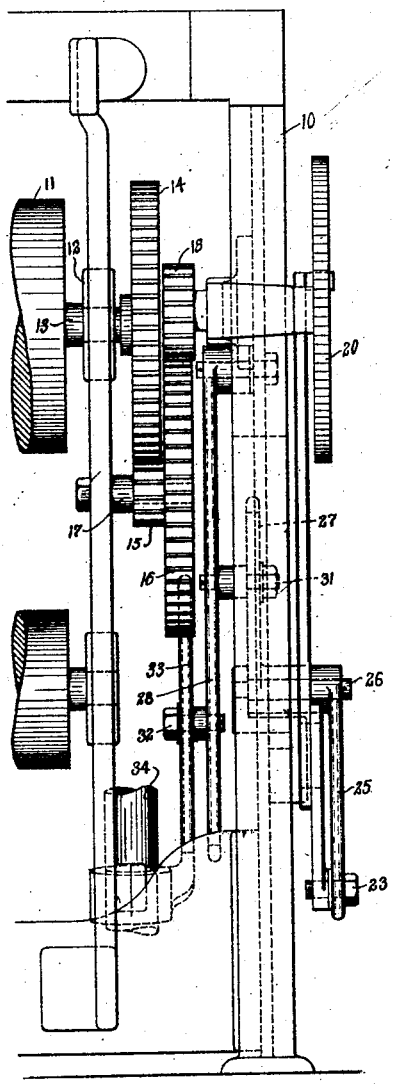
Fig. 1 is a front elevation of parts of a loom embodying my improvements.

Referring to the drawings, I have shown a loom frame 10 supporting a take-up roll 11 in a bearing 12. The shaft 13 of the roll has a large gear 14 fixed thereon and engaging an intermediate pinion 15. The pinion 15 is fixed to a gear 16 and rotates therewith upon a fixed stud 17. The gear 16 is driven by a pinion 18 mounted on a short horizontal shaft 19, provided at its outer end with a ratchet wheel 20.

A feed pawl 21 engages the ratchet wheel 20 and is preferably made in two parts, having a bolt and slot connection 22 by which the length of the pawl may be adjusted. At its lower end the pawl is pivoted upon a stud 23 which is slidable in a slot 24 in a bell crank 25. The stud 23 may be secured to the bell crank at any point in the length of the slot 24, thus varying the effective arm or leverage of the bell crank.

The bell crank 25 is provided with a fixed bearing 26 and has an upwardly extended slotted arm 27. A lever 28 is pivoted at 29 on the loom frame 10 and is provided with a slot 30 extending substantially the whole length of the lever.

Figure 2:
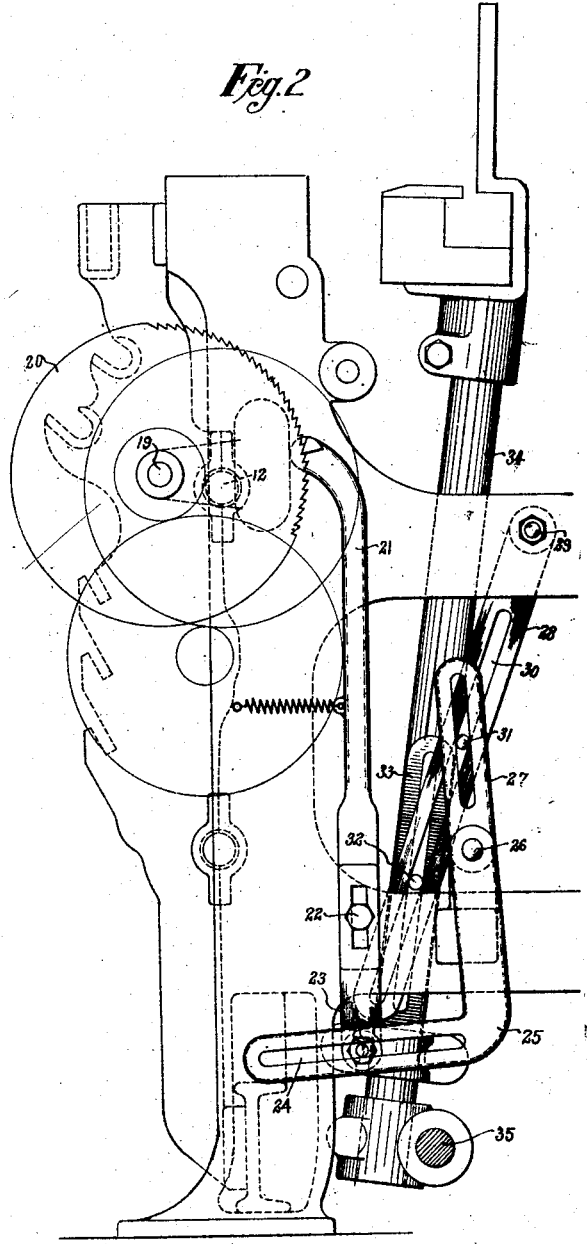
Fig. 2 is a side elevation of the mechanism shown in Fig. 1.

A stud 31 is fixed in the slotted arm 27 of the bell crank and extends into the slot 30 in the lever 28. A second stud 32 is fixed in a slotted member 33 which is clamped to the lay sword 34 or is otherwise mounted to move with the lay and sword about the axis of the pivot shaft 35 (Fig. 2).

Adjustment of the stud 32 in either direction tends to increase the leverage of one of the connected members and to correspondingly decrease the leverage of the other member, thus producing a relatively large change in the movement of the lever or arm 28. Similarly, adjustment of the stud 31 in the arm 27 also increases one leverage and decreases the other and produces a correspondingly large change in the extent of movement of the bell crank 25. Adjustment of the stud 23 in the slot 24 also increases or decreases the extent of movement of the pawl 21 and the locus of movement of the pawl may be adjusted by the bolt and slot connection 22.

It will thus be evident that an extremely wide variation in the amount of movement of the feed pawl is made possible by my improved construction. This wide range of feed is found to be particularly desirable in narrow ware and silk looms in which the rate of fabric production is subject to very wide variations.

Having thus described my invention and the advantages thereof, I do not wish to be limited to the details herein disclosed otherwise than as set forth in the claims, but what I claim is:—

1. In a loom, a take-up mechanism comprising a ratchet wheel, a feed pawl, a driving member having a fixed range of movement, and driving connections between said member and said pawl, said connections including elements co-operating in pairs and means to vary the connection between said elements in each pair, whereby the relative movement of either element may be increased and that of the other simultaneously decreased.

2. In a loom having a lay, a take-up mechanism comprising a ratchet wheel, a feed pawl, a lever by which said pawl is actuated, a second lever, and a member movable with the lay, said levers and said member being connected in pairs and each pair being adjustable to increase the leverage of either element and to decrease the leverage of the other element, thereby varying the feed.

3. In a loom having a lay, a take-up mechanism comprising a ratchet wheel, a feed pawl, a lever by which said pawl is actuated, a second lever, and a member movable with the lay, said two levers having a pin and slot connection, and said second lever and said member having a pin and slot connection, with provision for adjustment of said pins toward and away from said lay and towards and away from the pivots of said levers to vary the amount of feed produced thereby.

In testimony whereof I have hereunto affixed my signature.

FREDERICK H. SMITH.